July 9, 1940.  A. J. RHODES  2,207,441

FASTENING DEVICE

Filed Oct. 21, 1938

INVENTOR
ALBERT J. RHODES
BY
*Swan Tyre Hardesty*
ATTORNEYS

Patented July 9, 1940

2,207,441

UNITED STATES PATENT OFFICE 2,207,441

FASTENING DEVICE

Albert J. Rhodes, Pontiac, Mich., assignor to American Forging & Socket Company, Pontiac, Mich., a corporation of Michigan Application October 21, 1938, Serial No. 236,279

5 Claims. (Cl. 292—223)

This invention relates to latching means for closures, and particularly to the provision of simple and inexpensive, yet strong and secure means for releasably holding a door or lid. While the invention is described as applied to securing the hood portion of a motor vehicle, the fact that it is equally applicable to many other uses will be readily appreciated.

An important object of the invention is to provide an improved construction of the character indicated which is remotely controllable, in such manner as to enable, for example, locking and releasing the hood of a motorcar from within the passenger compartment.

Another object is to provide such a latching device having a pair of movable elements, one of which acts as a bolt, and the other of which acts both as an operating member for the bolt and as a wedge to hold it in place and positively prevent unwanted release of the closure or held portion.

Still another object is to provide in such a latching mechanism, improved tensioning means acting to hold the parts against rattling and displacement, and at the same time serving as a part of the actuating mechanism and providing an over-center action which yieldably maintains the parts either in closed or opened position.

Figure 1:
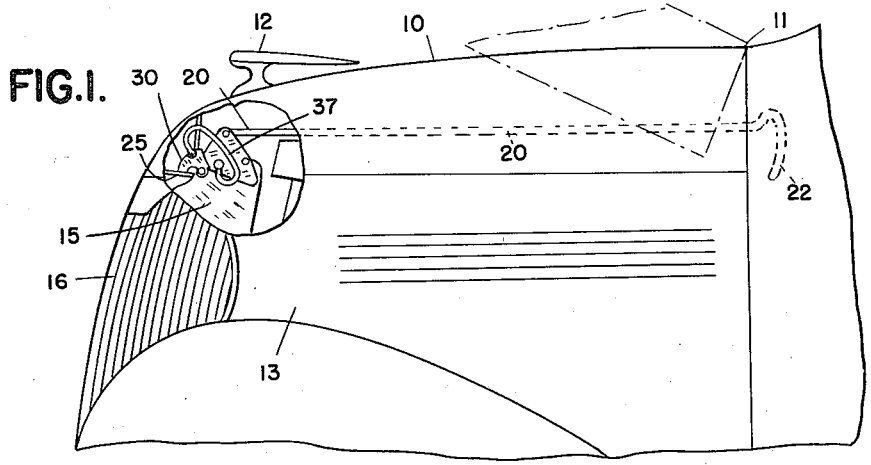
Figure 1 is a fragmentary and somewhat diagrammatic side elevational view of the front portion of a motorcar equipped with hood latching means constructed in accordance with the present invention, the hood being partially broken away to show the arrangement of the mechanism.

Referring now to the drawing, in which reference character 10 designates the lid section of the hood of a motor vehicle, it will be seen that the latching mechanism is carried by and at the top of the vertical baffle plate 15, which is centrally and longitudinally arranged inside the grill 16 at the front of the hood 13. The lid section is pivoted at the rear as at the point marked 11, and adapted to be lifted from the front, by means of the handle 12, when access to the engine compartment is desired. An operating link 20 extends from the latching mechanism rearwardly through the dash panel 18, being provided with a handle portion 22, positioned to be conveniently accessible to the operator of the vehicle.

A cross-bracing or gusset plate 25 fastened to the interior of the hood lid at the front and serving as a keeper, is engageable and disengageable by a swinging bolt member 30, pivoted as at 27 upon a bracket plate 28 attached to the top of the supporting panel 15. The bolt will be seen to be swingable forwardly and downwardly to hold down the lid section by engagement with the gusset plate, and swingable upwardly and rearwardly to free the plate and allow the lid to be lifted.

Another plate 35, pivoted to the bracket 28 farther to the rear, serves as an actuating member for the bolt and is connected thereto by a spring link 37 of generally inverted U-shape.

The points of articulation of the ends of the spring link to the bolt and to the actuating plate 35 are designated 31, 41, respectively, while the pivotal connection of the plate 35 to the bracket is designated 37. The distance between points 31, 41 when the spring link is relaxed, is, in the shown construction, slightly less than the distance between points 27, 37, but is a substantial proportion of such distance so that the plates 30, 35, and the link 37, may swing substantially as a parallelogram linkage. These points are so selected that the spring link is compressed, to force its legs toward each other, when the operating plate and bolt members are in locked position. At this time the point 41 lies below a line (diagrammatically indicated at 40) drawn between points 31, 37. By virtue of this arrangement, the spring then urges both the bolt and actuating plate toward and yieldably maintains them in locked position, while in order to release the bolt, it is necessary to so rotate the actuating plate (clockwise as viewed in Figure 2) as to lift the point 41 through and above such line. The spring link is compressed during such movement, until the point 41 reaches such line whereafter the spring is allowed to expand. Although it is relatively stiff, the expansion of the spring is not great and after reaching relaxed position, it serves as a simple link, so that continued rearward movement of plate 35, induced by the rod 20, draws the bolt upwardly and rearwardly to free the lid.

Figure 2:
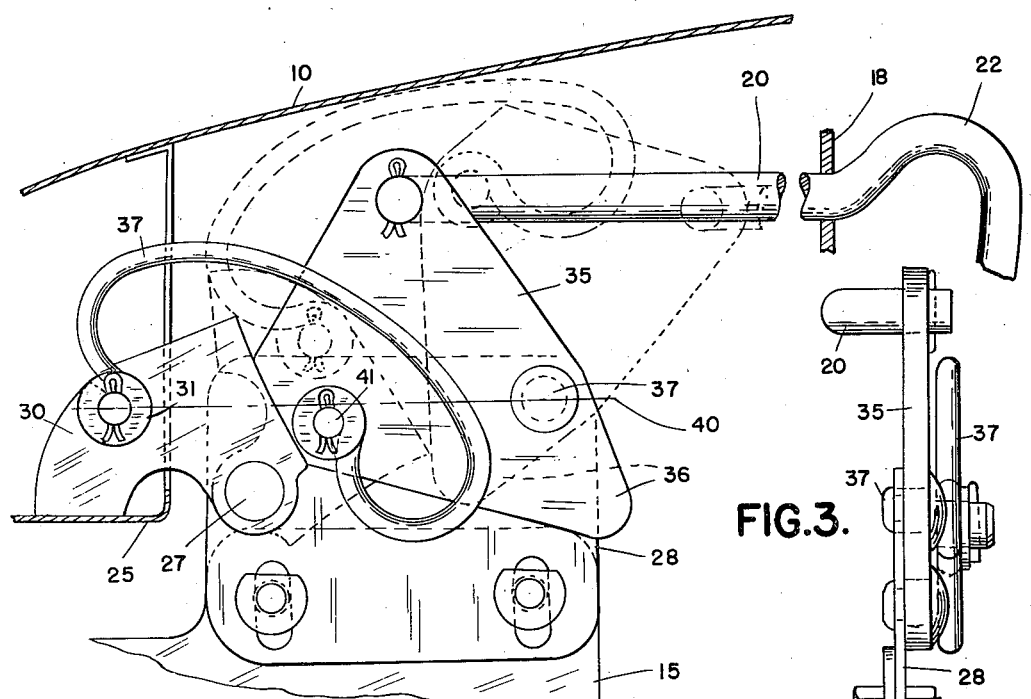
Figure 2 is an enlarged side elevational view of the latching mechanism, as installed, showing adjacent parts in section, and with the operating link centrally broken away.
Figure 3:
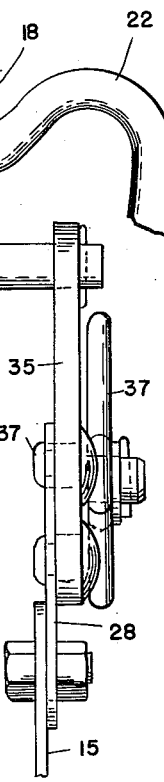
Figure 3 is a front elevational view of the latching mechanism with the lid section of the hood removed.

Figure 2 shows both extreme positions to which the actuating plate is moved by means of the operating rod 20, the closed position being indicated in full lines, and the released position in dotted lines. The actuating plate and bolt members are formed of sheet metal and mounted in co-planar relation upon the same side of the bracket 28. The nose of the plate 35 engages the angular rear edge of the bolt member when the parts are in locked position and constantly urges it tighter by a camming action under the effort of the spring link. When the parts are in the released position indicated in dotted lines, the toe portion 36, which projects from the opposite side of the fulcrum 37, is moved forwardly far enough to lie in the path of the bolt and limit its rearward movement, also as shown in dotted lines in Figure 2.

What I claim is:

1. Releasable holding means for a closure or the like, comprising in combination with suitable supporting means, a holding arm and an operating arm rockable thereupon about substantially fixed axes, a resilient link element connecting said arms at predetermined points spaced from their rocking axes to transmit rotation from the operating arm to the holding arm, said point on the operating arm being movable through a line connecting the point on the holding arm with the axis of the operating arm, said resilient link element being tensioned during such movement to provide an overcenter spring action, whereby said element yieldably maintains said arms in a predetermined relative position, and a blocking portion carried by the operating arm and engageable with the holding arm to act as positive stop means limiting their relative movement, and to lock the holding arm in holding position.

2. Means as set forth in claim 1 in which said blocking portion acts as a cam and urges the holding arm more tightly toward holding position under the influence of the tension upon said link.

3. Means as set forth in claim 1 in which said blocking portion comprises a cam section actuable by said resilient link to urge the holding arm toward holding position, and a second blocking portion also carried by said operating arm for limiting movement of said holding arm in the opposite direction.

4. Means as set forth in claim 1 in which the effective length of said resilient link element when relaxed is substantially conformable to the distance between the pivotal axes of said arms, whereby said arms may swing in substantially parallel relation through at least a part of their paths of movement.

5. Means as set forth in claim 1 in which said blocking portion carried by the operating arm comprises a camming portion arranged at a wedging angle with respect to the holding arm, to urge said holding arm in a predetermined direction and positively lock it against return movement, said blocking portion being engageable with the holding arm when said point of the operating arm is in the overcenter position.

ALBERT J. RHODES.